United States Patent [19]
Gelin et al.

[11] Patent Number: 5,151,925
[45] Date of Patent: Sep. 29, 1992

[54] COHERENT DEMODULATION METHOD FOR A DIGITALLY MODULATED SIGNAL HAVING A CONTINUOUS PHASE AND A CONSTANT ENVELOPE

[75] Inventors: Benoît Gelin, Bonneuil; Michel Lebourg, Marcoussis, both of France

[73] Assignee: U.S. Philips Corp., New York, N.Y.

[21] Appl. No.: 370,214

[22] Filed: Jun. 22, 1989

[30] Foreign Application Priority Data

Jun. 28, 1988 [FR] France .................... 88 08651

[51] Int. Cl.⁵ ............................ H04L 27/22
[52] U.S. Cl. ........................ 375/82; 375/84; 375/106
[58] Field of Search ............ 375/84, 80, 82, 96, 375/97, 114, 106; 329/307; 370/102, 105.1, 105.3

[56] References Cited

U.S. PATENT DOCUMENTS

| | | | |
|---|---|---|---|
| 4,583,048 | 4/1986 | Gumacos et al. | 375/96 X |
| 4,715,047 | 12/1987 | Hambley | 375/84 |
| 4,847,869 | 7/1989 | Labedz et al. | 375/114 |
| 4,888,793 | 12/1989 | Chanroo et al. | 375/84 |

Primary Examiner—Benedict V. Safourek
Assistant Examiner—Tesfaldet Bocure
Attorney, Agent, or Firm—Jack D. Slobod

[57] ABSTRACT

The method ensures the coherent demodulation by digitally processing a continuous-phase modulated signal (for instance, of the GMSK type). The received signal is transposed in the baseband, converted into a digital signal and transferred to a signal processor. Each transmitted data packet has a known preamble sequence of N bits which allows for approximate estimation of the frame-synchronization and the bit-synchronization and also the initial phase and the residual frequency offset. The progressive refinement of the estimation is obtained with two interleaved digital loops: a slow loop for detecting the bit-synchronization and a fast loop effecting intermediate decisions over additional blocks of bits for the estimation of the initial phase and the residual frequency offset.

16 Claims, 8 Drawing Sheets

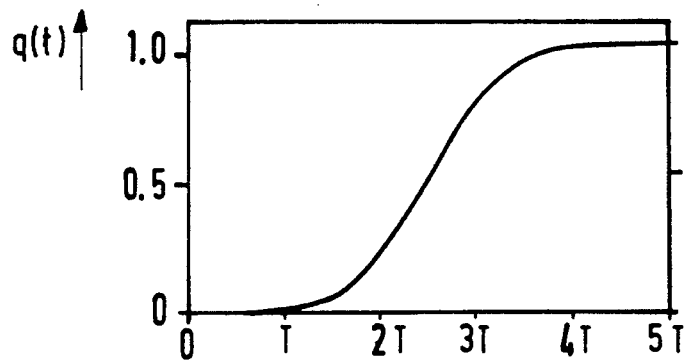
FIG. 2a GMSK
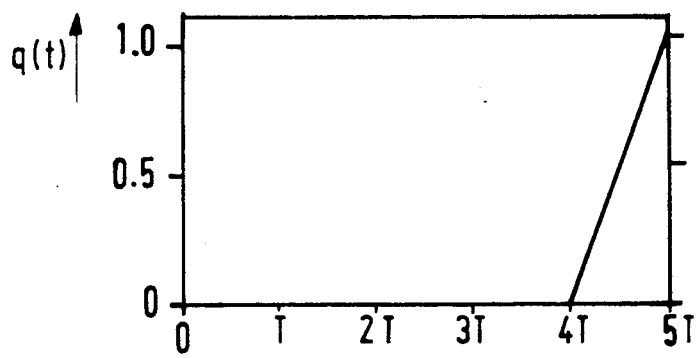
FIG. 2b MSK
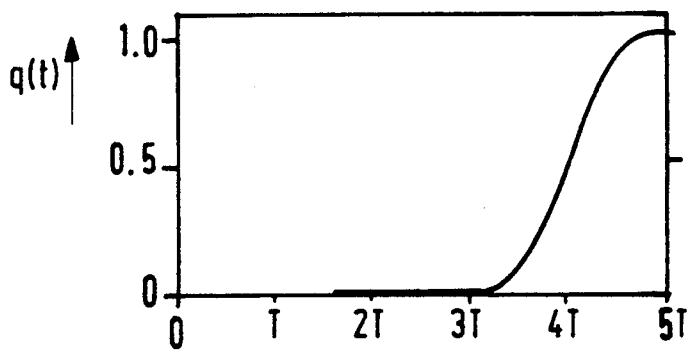
FIG. 2c 2SRC

COHERENT DEMODULATION METHOD FOR A DIGITALLY MODULATED SIGNAL HAVING A CONTINUOUS PHASE AND A CONSTANT ENVELOPE

BACKGROUND OF THE INVENTION

The invention relates to a method of coherent demodulation for digitally processing a digitally modulated signal having a continuous phase and a constant envelope, the modulated term of the above phase is equal to the convolution product of the phase impulse response extending over a plurality of bit periods by the binary information transmitted in packets. The received signal is transposed in the baseband over two quadrature channels, converted into a digital signal and transferred to a signal processor which carries out the demodulation method.

This method can be applied to whatever phase modulation of the aforesaid type (GMSK, MSK, 2SRC, TFM, GTFM, ... ), whose phase evolution law following a progressive variation is advantageous in that it reduces the frequency spectrum. Another advantage is that the transmitted energy is constant.

Modulation of the GMSK type, whose phase variation extends over the largest time interval (5 bit periods), presents the best spectral efficiency. Unfortunately, this results in a considerable augmentation of intersymbol interference.

The use of this narrow band modulation may be considered for many domains such as protected VHF and UHF communication systems, satellite transmissions or mobile radio-networks. The above advantages have caused the "Groupe Spécial Mobile" (GSM) of the CEPT to retain this narrow-band modulation to be used in the future digital Pan-European digital mobile network beginning in 1992.

The various prior-art demodulation processes implement differential or coherent methods.

The differential demodulation method is advantageous in that it is relatively simple but the performance in terms of error rates is very poor.

The coherent demodulation method presents better performance but it requires an additional circuit for the carrier phase recovery.

One of the weaknesses found with this type of demodulation resides in the use of conventional synchronizing methods which utilize phase locked loops for recovering the carrier and clock signals.

In fact, when a system that operates in the Time-Division-Multiple-Access (TDMA) mode or in the Frequency-Hopping (FH) mode in which the signal is subjected to fading caused by the channel, the resynchronization times of the analog loops become too long and reduce the useful duration of the signal (see U.S. Pat. No. 4,570,125 by R. B. Gibson and B. Hill).

The implementation of a method of coherent demodulation by means of digital signal processing presents as the main advantage the possibility of storing and processing the signal in packets for each of which a sequential operation is performed ending in a decision as to the transmitted binary information.

The first operation of the sequence consists of finding the beginning of the packet; this is the frame-synchronization. Then the bit-synchronization determines the decision instants and ensures the proper temporal adjustment of the matched filter. The role of this filter is to reduce the noise without degrading the useful information.

The last operation is extremely important: it concerns the estimation of the initial phase and the residual frequency offset.

The initial phase is a parameter which is not controlled in a transmission system. A faulty estimation of this parameter is disastrous for the error rate.

The residual frequency offset is the resultant of the frequency offset between the transmitter and the receiver and the frequency offset due to the Doppler effect. A faulty evaluation of this frequency offset results in decision errors with respect to the last bits of the packet, when the phase has been sufficiently rotated for causing such errors.

After estimating the initial phase and the residual frequency offset a compensation is effected and finally a decision is made with respect to the transmitted bits.

A digital demodulation method utilized for the 2SRC modulation was proposed in the article by LOUBATON and VALLET entitled: "Demodulation pseudo-cohérente de signaux de type MSK adaptée aux transmissions en EVF" and published in the Revue Technique Thomson-CSF, Vol. 17, September 1985, No. 3, pp. 521-554.

In this method the following processing sequence is found: frame-synchronization by partial correlation; bit-synchronization by detection of the zero crossing of the differential phase; matched filtering; estimation of the residual frequency offset by Fast-Fourier-Transform of the squared samples; estimation of the initial phase by averaging; and phase compensation.

After simulation, the proposed algorithms have been found to adapt poorly to the GMSK modulation.

Actually, as a result of the intersymbol interference which can no longer be neglected, the determination of the bit-synchronization is degraded considerably in the presence of a residual frequency offset exceeding 200 Hz.

In addition, for estimating this frequency offset, the modulation can no longer be eliminated by effecting a squaring operation.

A demodulation technique for packet transmission by radio is given in the article by C. HEEGARD, J. A. HELLER and A. J. VITERBI, entitled: "A microprocessor-based PSK Modem for Packet Transmission over Satellite Channels" and published in IEEE Trans., Vol. COM-26, No. 5, May 1978, pp. 552-564.

Inspired by this technique, which only applies to a PSK type of modulation without intersymbol interference, the object of the invention is to obtain a synchronization which permits the coherent demodulation of modulation that results in intersymbol interference, even with a high noise level and a large residual frequency offset.

SUMMARY OF THE INVENTION

The method according to the invention is characterized in that each of the said packets contains a preamble sequence providing a known reference signal of N bits and permitting approximate frame-synchronization and bit-synchronization by means of correlation with the differential phase, and initiate estimation of the parameters of the initial phase $\theta_0$ and residual frequency offset $\Delta f_0$. The progressive refinement of the approximate values is obtained by means of two interleaved digital loops: a slow loop activated when a threshold value for detecting the bit-synchronization is exceeded, and a fast loop effecting intermediate decisions over additional blocks of bits for the estimation of $\theta_0$ and $\Delta f_0$.

The detection of the frame-synchronization and the bit-synchronization is obtained by means of a first correlation with the differential phase permitting determination of the transmission instant of the packets with a precision of $\pm T/4$, where T is the duration of one bit, then by means of a second correlation with the differential phase effected with a reference signal shifted by $T/4$. The corresponding correlation functions each show a peak which is independent of the initial phase and slightly dependent on the residual frequency offset, the highest peak and the lowest peak defining a primary bit-synchronization value SYNP and a secondary bit sync SYNS respectively. The precision of $\pm T/8$ thus obtained in the bit-synchronization value is sufficient to determine the sampling instant.

The detection of the bit-synchronization is followed by a matched filtering carried out with the value SYNP by means of a filter having a finite impulse response of the Gaussian type in order to limit the noise band.

The estimation of the initial phase $\theta_0$ and of the residual frequency offset $\Delta f_0$ after the matched filtering comprise the following steps:

Eliminating the modulation term by forming the product of the received signal and the conjugate value of the reference signal.

Phase unrolling by eliminating the $2\pi$ phase jumps to obtain a linear variation having the following equation $$y = \Delta\omega_0 x + \theta_0 \text{ with } \Delta\omega_0 = 2\pi\Delta f_0.$$

Calculating the estimated parameters $\Delta\hat{\omega}_0$ and $\hat{\theta}_0$ by means of a linear regression method and the difference $$\epsilon = \sum_{i=0}^{N} |y_i - (\Delta\hat{\omega}_0 \cdot x_i + \hat{\theta}_0)|^2$$

between the points corresponding to the said unrolled phase and the said regression line.

If the above difference $\epsilon$ is smaller than the threshold value for detecting bit synchronization, this estimation of $\Delta f_0$ and $\theta_0$ is refined in a fast loop for a plurality of tours and exploiting the intermediate decisions on the N bits of the preamble sequence to which at each tour a specified number of decided bits are added.

If the above difference $\epsilon$ exceeds the said threshold value as a result of an erroneous evaluation of the bit-synchronization, the above calculating step is re-initiated in a slow loop in order to effect again the matched filtering and the estimation of $\Delta f_0$ and $\theta_0$ on the basis of the other value of the bit-synchronization which is equal to the value of the secondary bit-synchronization SYNS.

After the last tour, a compensation step is performed which leaves only the phase component of the signal which is not affected any longer by the residual frequency offset nor by the initial phase.

The final decision is then made after which a differential decoding finally provides the stream of transmitted binary information.

BRIEF DESCRIPTION OF THE DRAWINGS

The invention will be better understood with the aid of the following description given by way of a non-limiting example, this description being accompanied by drawings in which:

FIGS. 2a, 2b, 2c respectively show the phase impulse responses for the GMSK, MSK and 2SRC types of modulation;

DESCRIPTION OF THE PREFERRED EMBODIMENT

Figure 1:
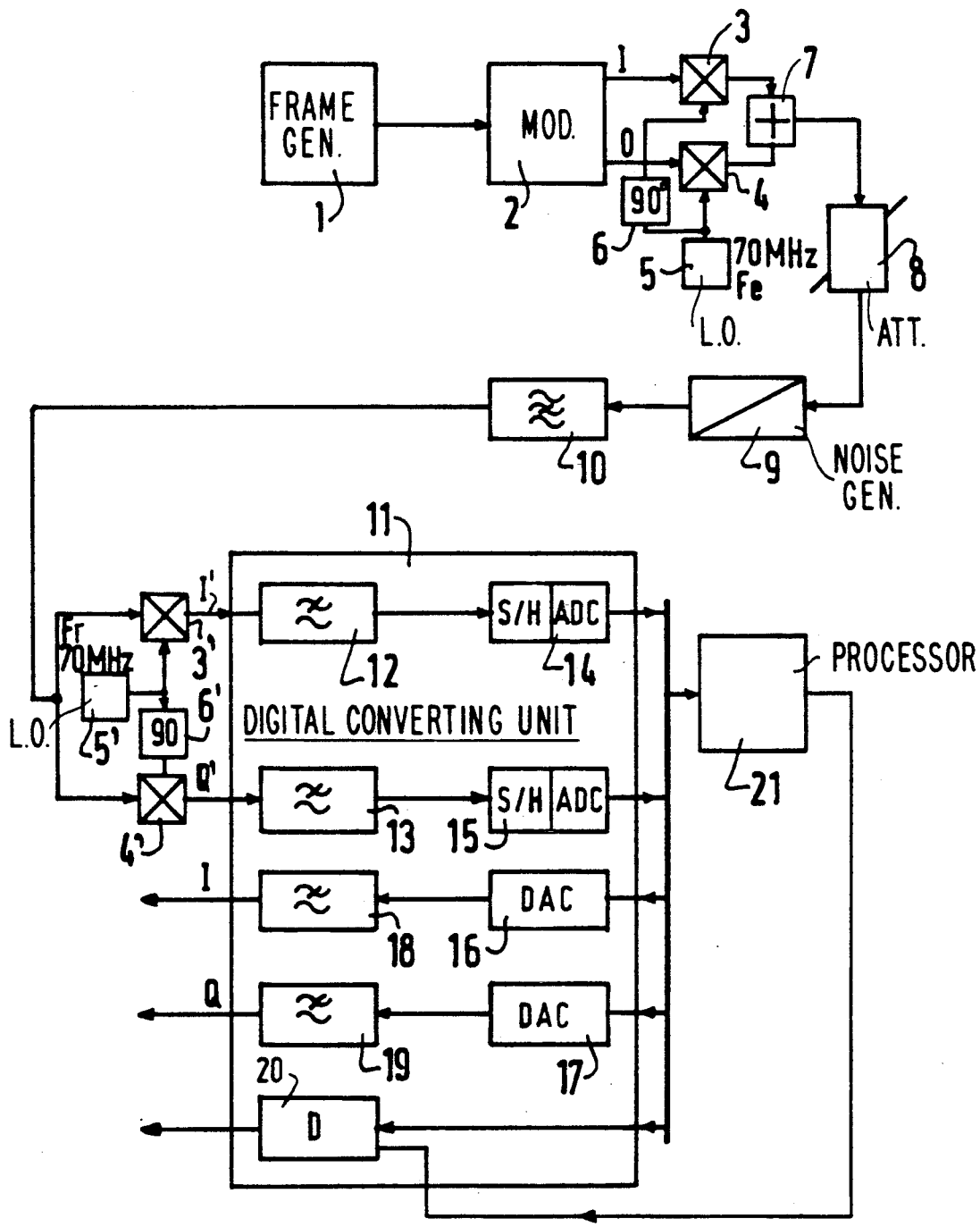
FIG. 1 shows the block diagram of a modulator-demodulator means.

The demodulation of a GMSK signal according to the method of the invention has been simulated on a modulator-demodulator arrangement of which FIG. 1 shows the diagram in the form of function blocks comprising, in succession:

A frame generator 1 comprising a polynomial generator of a pseudorandom binary data stream at the rate of 16 kbit/s. The format of each transmitted frame is 128 bits with a known preamble sequence of N=16 or 32 bits which is placed at the beginning of the frame by means of a system comprising registers and flip-flops. Thus, 128-N bits remain available for the information to be transmitted.

A modulator 2 which generates a phase impulse response having a progressive variation of the GMSK type for convolving with the data stream. The modulated signal is available in the baseband region on two quadrature channels I and Q.

The elements for frequency transposition to the intermediate frequency of 70 MHz. This transposition is effected at the send end by means of mixers 3 and 4 realizing respectively, the mixing of the signals coming from the I and Q channels with the signal from a local oscillator 5 having the frequency $F_e$ and the same signal shifted in phase by 90° in the phase shifter 6. After summing the signals coming from the two channels in the adder 7, the resulting signal from this adder passes successively through an attenuator 8, a generator 9 of (additive), white-Gaussian-noise with spectral density $N_0$ which allows to simulate the real operating conditions and a wideband filter 10 centered at 70 MHz.

At the receive end, the transmitted signal is transposed back into a baseband signal (real part and imaginary part being available on the I' and Q' channels respectively) by means of the mixers 3' and 4', the local oscillator 5' having the frequency $F_r$ and by means of the 90° phase shifter 6'.

A digital converting unit 11 comprising respectively, for the I' and Q' channels to be processed, the low-pass filters 12 and 13 ensuring the sampling while respecting the Shannon condition, and the analog-to-digital converters 14 and 15 preceded by sample-andhold circuits which hold the level of the signal for the duration of each conversion.

The I' and Q' channels are resorted to for carrying out checks (among other things the visualization of the I and Q channels after filtering) after inverse transformations performed by the digital-to-analog converters 16 and 17 and the filters 18 and 19. After being decoded, the binary data stream is also output through the flip-flop 20.

A processor unit 21 comprising a digital signal processor in which the demodulation of the GMSK signal is effected in accordance with the method according to the invention, this processor operating in a complex calculation mode and being controlled by a microprocessor.

When the digital information to be transmitted is conveyed by the phase, the modulated signal may assume the form:

$$S(t,B) = \sqrt{\frac{2E}{T}} \exp\{j[2\pi f_0 t + \theta_0 + \phi(t,B)]\}$$

where
t = time
B = ($B_i$), the stream of transmitted binary information
E = signal energy
T = duration of one bit
$f_0$ = carrier frequency (angular frequency $\omega_0 = 2\pi f_0$)
$\theta_0$ = phase at the time-origin (initial phase)
$\phi(t,B)$ = phase varying in response to the stream of binary information according to the relation:

$$\phi(t,B) = 2\pi \frac{1}{2} \sum_{i=-\infty}^{+\infty} B_i \cdot q(t - iT)$$

where q(t) is the phase impulse response of a finite duration.

The term $\frac{1}{2}$ in the expression of the phase corresponds with the modulation index, that is to say, with the ratio of frequency deviation to clock frequency.

The function q(t) called phase impulse reponse represents the manner in which the phase will vary.

FIGS. 2a, b, c represent the variation of this function q(t) for the GMSK, MSK and 2SRC types of modulation.

For the GMSK modulation the phase variation extents over 5 bit periods as against 2 bit periods for the 2SRC modulation and 1 bit period for the MSK modulation.

Figure 3:
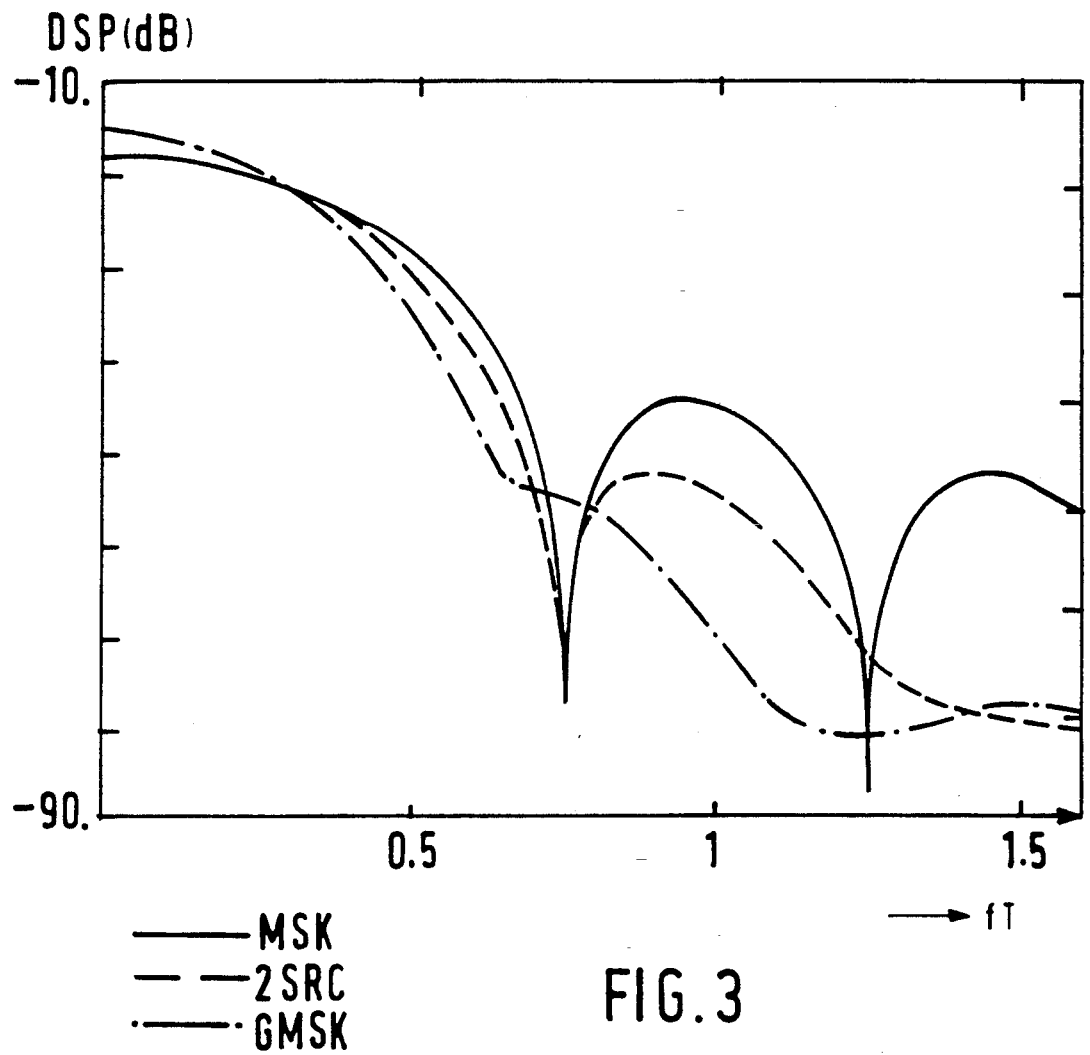
FIG. 3 shows the spectral occupation diagrams for the GMSK, MSK and 2SRC types of modulation.

As this variation is slower for the GMSK modulation, the occupied spectrum is smaller, as is shown by the curves of FIG. 3, which represent the variations of the spectral power density (DSP) in dB plotted against the product (fT) of the frequency f and the duration T of one bit interval, for the MSK modulation (solid line), 2SRC modulation (dashed line) and GMSK modulation (dash-and-dot line).

Figure 4:
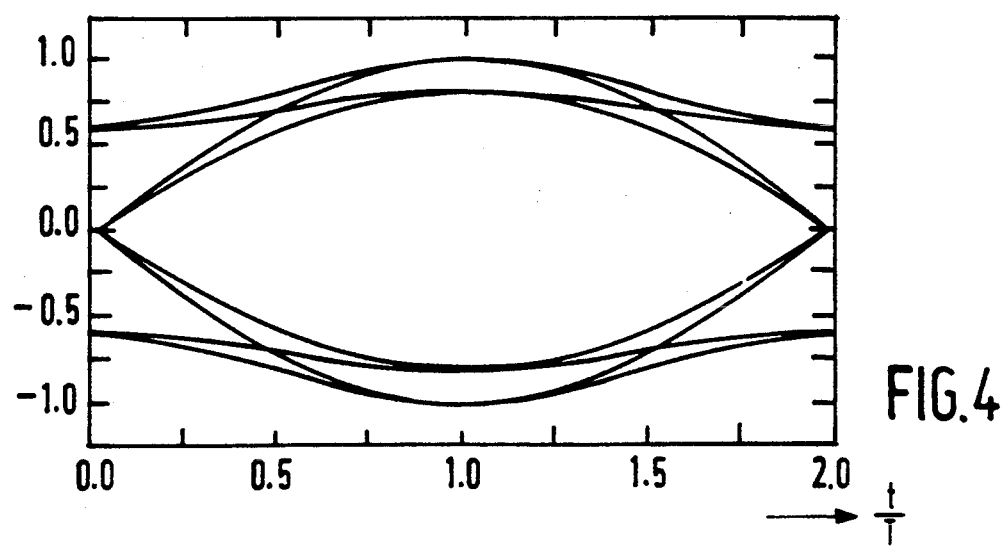
FIG. 4 shows the eye pattern for the GMSK modulation.

But the spreading of the information over 5 bit periods for the GMSK modulation results in the presence of intersymbol interference which is evident from the eye pattern of FIG. 4 obtained from observing the GMSK signal by means of an oscilloscope synchronised with the bit clock signal.

Now the successive stages of the coherent demodulation of a digitally modulated signal having a continuous-phase and a constant envelope in accordance with the method of the invention will be explained.

For utilizing a method which exploits the presence of intersymbol interference it has appeared to be indispensible to insert a preamble sequence of length N at the beginning of each packet.

This known preamble sequence allows of detecting the beginning of the frame by means of correlation and, thereafter, starting the estimation of $\theta_0$ and $\Delta f_0$.

The procedure can be broken down into four main parts: frame-synchronization and bit-synchronization (hereinafter referred to as frame-sync and bit-sync), matched filtering, estimation of $\theta_0$ and $\Delta f_0$, and decision.

Frame-sync and bit-sync.

The detection of the frame-sync and the bit-sync is effected by correlation with the differential phase. The normalized complex signal which is transposed back into the baseband on reception has the following equation:

$$S(t) = \exp\{j[2\pi \Delta f_0 t + \theta_0 + \phi(t)]\}$$

in which $\Delta f_0$ represents the difference between the send frequency $f_e$ and the receive frequency $f_r$ to which is added the frequency $f_d$ of the Doppler effect when the receiver is moving with respect to the transmitter is:

$$\Delta f_0 = f_e - f_r + f_d.$$

Due to the preamble sequence a known reference signal is available for an interval having a duration NT, so that:

$$R(t) = \exp\{j\phi(t)\} \text{ with } t \in [0, NT]$$

Thus a signal S' is defined which is equal to the product of the signal S and its conjugate value delayed by two bit periods:

$$S'(t) = S(t) \cdot S^*(t-2T) = \exp\{j[4\pi \Delta f_0 T + \phi(t) - \phi(t-2T)]\}$$

Putting that $\Delta\phi(t) = \phi(t) - \phi(t-2T)$, the differential phase between two bit periods is shown explicity, and so: $S'(t) = \exp\{j[4\pi \Delta f_0 T + \Delta\phi(t)]\}$ In this expression of S'(t), the term of the initial phase has disappeared and the frequency offset $\Delta f_o$ results in a continuous phase shift.

On the basis of the reference signal R another signal R' is also defined so that:

$$R'(t) = R(t) \cdot R^*(t-2T) = \exp\{j\Delta\phi(t)\}$$

The correlation function of the two complex signals S' and R' can be written as:

$$C(\tau) = \int_T^{NT} S'(t) \cdot R'^*(t-\tau) dt$$
$$= \exp\{j4\pi \Delta f_0 T\} \int_T^{NT} \exp\{j[\Delta\phi(t) - \Delta\phi(t-\tau)]\} dt$$

When squaring the modulus $C(\tau)$, the term $\exp\{j4\pi \Delta f_0 T\}$ will disappear:

$$|C(\tau)|^2 = \left| \int_T^{NT} \exp\{j[\Delta\phi(t) - \Delta\phi(t - \tau)]\}dt \right|^2$$

Searching for the maximum of the function $|C(\tau)|^2$ thus permits determination of the beginning of the packet because $|C(\tau)|^2$ has its maximum for $\tau=0$.

The advantage of effecting the correlation with the differential phase is the fact that the correlation peak is independent of the phase $\theta_o$ at the time-origin and slightly dependent on the frequency offset $\Delta f_o$ as long as $\Delta f_0 T \ll 1$, that is to say, as long as this takes place within the passband band of the filter arranged at the output of the transmitter.

However, the maximum level of the correlation peak is more sensitive to noise (which comes down to having a signal-to-noise ratio degraded by 3 dB).

There are now two aspects of the choice of the preamble sequence: its length (N=number of bits) and the configuration of the bits.

The longer the packet, the better will be the Probabilities of False Alarm (PFA) and of Non-Detection (PND).

The bit configuration of the packet has an effect on the precision of the timing adjustment. The choice is not very easy but, nevertheless, a choice can be made while respecting the following contraints:

non-periodic sequence (if not, a plurality of correlation peaks will occur)

non-constant sequence (if not, a considerable spreading in time will occur), a sequence not comprising too many alternate values (if not, this will bring about too small phase variations).

The correlation method explained hereinbefore can be applied to the calculation of the frame sync by accomplishing this correlation at the rate of 2 samples per bit period. When denoting the value $$S\left(i\frac{T}{2}\right)$$

of S(t) for $$t = i\frac{T}{2}$$

and i=an integer, by S(i), we have $$S(i) = \exp\left\{j\left[2\pi\Delta f_0 i \frac{T}{2} + \theta_0 + \phi\left(i\frac{T}{2}\right)\right]\right\}$$

$$R_1(i) = \exp\left\{j\phi\left(i\frac{T}{2}\right)\right\}$$

We calculate:

$$S'(i) = S(i) \cdot S^*(i - 4) = \exp\left\{j\left[4\pi\Delta f_0 T + \Delta\phi\left(i\frac{T}{2}\right)\right]\right\}$$

$$R'_1(i) = R_1(i) \cdot R_1^*(i - 4) = \exp\left(j\Delta\phi\left(i\frac{T}{2}\right)\right)$$

Putting:

$$C_1(j) = \left| \sum_4^{2N-1} S'(i) \cdot R'_1{}^*(i - j) \right|^2,$$

searching for the maximum of $C_1(j)$ allows of detecting the beginning of the packet. When this maximum is detected, the frame-sync is acquired and the send instant of the packet is known to $\pm T/4$.

This precision is not sufficient for detecting the bit-sync.

In order to improve the estimation a second correlation is to be effected with a reference signal shifted by T/4. As for the first correlation the following equations are defined:

$$R_2(i) = \exp[j\phi(i\,T/2 + T/4)]$$

$$R'_2(i) = \exp[j\Delta\phi(i\,T/2 + T/4)]$$

$$C_2(j) = \left| \sum_4^{2N-1} S'(i) \cdot R'_2{}^*(i - j) \right|^2,$$

The two correlations $C_1(j)$ and $C_2(j)$ present peaks for the respective indices $J_1$ and $J_2$. If $C_1(J_1) \geq C_2(J_2)$, we take bit-sync=$J_1$ T/2 If $C_2(J_2) > C_1(J_1)$, bit-sync=$J_2$ T/2+T/4.

This double correlation permits to have a precision of $\pm T/8$ in the bit-sync.

Allowing for the slowness of the phase variation for the GMSK modulation, this precision is good enough to know the sampling instant.

It has already been described that in certain cases in which the signal-to-noise ratio is low ($E_b/N_0 < 6$ dB), the choice of the bit-sync could be erroneous. This results from the dubious estimation of the level of the correlation peaks (for example if one chooses $J_2T/2+T/4$ instead of $J_1T/2$).

For making the ultimate decision, SYNP will be defined as the "primary" value of the bit-synch and SYNS the value of the "secondary" bit synchronisation.

If $C_1(J)_1 \geq C_2(J_2)$ then SYNP: $J_1$ T/2, SYNS: $J_2$ T/2+T/4

If $C_2(J_2) > C_1(J_1)$ then SYNP: $J_2$ T/2+T/4, SYNS: $J_1$ T/2.

The matched filtering will be effected with the value SYNP.

The possible modification will be effected in the algorithm for estimating the frequency difference and the initial phase on the basis of an error criterion which will be defined hereinafter.

The error in the bit-sync has little effect on the matched filtering; on the contrary, this error enormously degrades the estimation of $\Delta f_0$ and $\theta_0$.

This method of double correlation with the differential phase is advisable for it permits to determine the beginning of the frame and make a first estimation of the bit-sync. The latter parameter will be confirmed or adjusted in the course of the estimation of the phase of the carrier signal.

Matched filtering

It may be shown (cf. P. A. LAURENT: "Interprétation des modulations d'indice demi-entier. Extension àdes indices voisins et applications" $9^{th}$ Colloque GRETSI, Nice, May 1983, pp. 503-509) that all the digital modulations of the form $S(t,B) = \exp[j.\phi(t,B)]$ can be represented in the form of an amplitude modulation according to the following expression:

$$S(t,B) = \sum_{i=-\infty}^{+\infty} j^i C_i F_p(t - iT)$$

with $$C_i = \prod_{i=-\infty}^{n} B_i$$

wherein $F_p(t)$ is the principal function.

Breaking down the GMSK modulation into an amplitude modulation is particularly interesting for it permits to determine the matched filter in a simple manner.

The latter filter has an impulse response which is equal to $F_p$(t-sync-bit).

The term sync-bit takes into account the position of the received signal relative to the sample clock signal.

Preferably the matched filter is realized in the form of a Finite Impulse Response filter having 11 coefficients.

Estimation of the initial phase and frequency offset

The considered method is based on the use of the preamble sequence.

Figure 5A:
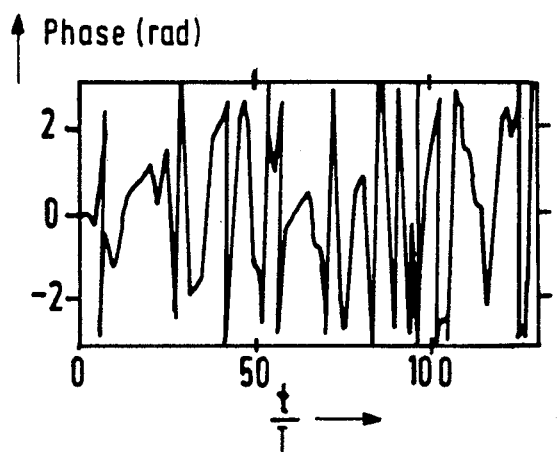
FIGS. 5a, 5b, 5c, 5d show the temporal variations of the phase of the received signal after filtering in successive stages during the sequence of evaluating $\theta_0$ and $\Delta f_0$.

At the output of the matched filter there is a received signal whose variation is plotted against time in FIG. 5a. After being normalized this signal is expressed by:

$$Z(t) = \exp\{j[2\pi\Delta f_0 t + \theta_0 + \phi(t)]\}$$

Since the preamble sequence is known, the evolution of the signal over an interval [0,NT] can be calculated in a simple manner, where N is the number of bits of the preamble sequence.

Figure 5B:
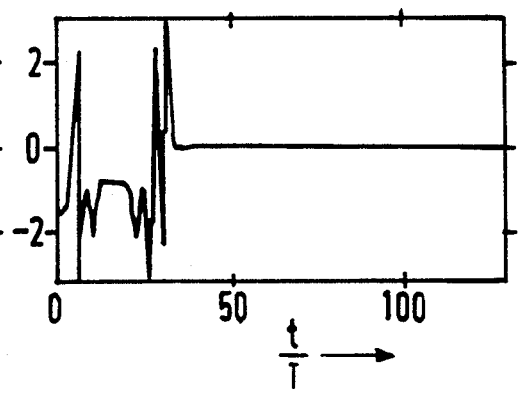

Thus, the reference signal is known of which FIG. 5b shows the variation plotted against time and of which the normalized expression can be written as:

$$Z_0(t) = \exp\{j\phi(t)\} \text{ for } t \in [0,NT]$$

Figure 5C:
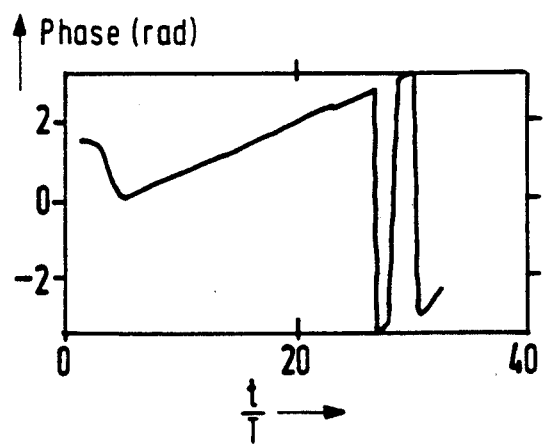

When forming the product of the received signal Z(t) by the conjugate value of the reference signal $Z_0(t)$, the term $\phi(t)$ due to the modulation is eliminated (FIG. 5c).

$$Z(t).Z_0^*(t) = \exp\{j[2\pi\Delta f_0 t + \theta_0]\}$$

The next stage consists of transforming the obtained complex signal into a linear variation which interprets the phase evolution.

$$\phi(t) = \text{Arctg}[Z(t).Z_0^*(t)] = [2\pi\Delta f_0 t + \theta_0] \text{ modulo } 2\pi.$$

Therefore, the phase has to be unrolled by eliminating phase jumps of $2\pi$.

Figure 5D:
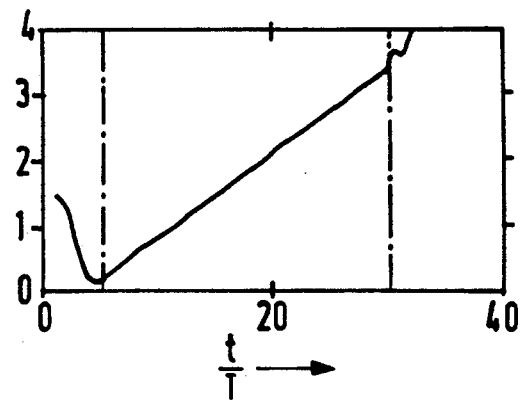

FIG. 5d represents this variation of which the equation is:

$$y = \Delta\omega_0.x + \theta_0 \text{ with } \Delta\omega_0 = 2\pi\Delta f_0$$

By means of a linear regression method the estimated parameters $\Delta\omega_0$ and $\theta_0$ can be calculated. This calculation is systematic and thus simple to use.

On the basis of these estimated parameters the signal can now be compensated for by effecting a complex multiplication:

Received signal: $Z(t) = \exp\{j[\Delta\omega_0 t + \theta_0 + \phi(t)]\}$

Compensated signal: $S(t) = Z(t)\exp[-j(\Delta\hat{\omega}_0 t + \hat{\theta}_0)]$ and thus $$S(t) = \exp\{j[(\Delta\hat{\omega}_0 - \Delta\omega_0)t + \hat{\theta}_0 - \theta_0 + \phi(t)]\}$$

If the estimation is correct, $$\Delta\hat{\omega}_0 = \Delta\omega_0, \hat{\theta}_0 = \theta_0 \text{ and } S(t) = \exp\{j\phi(t)\}$$

The obtained signal is no longer affected by a frequency offset nor by the phase at the time-origin.

The estimation of $\Delta\omega_0$ and $\theta_0$ is sensitive to three parameters: noise, timing adjustment and the length of the preamble sequence.

When the noise augments ($E_b/N_0 < 6$ dB), this may cause sudden phase variations which result in jumps of $2\pi$ of the unrolled phase. This problem has been solved by using a technique for detecting and correcting phase jumps of $2\pi$.

The sensitivity to timing adjustment is linked with the evaluation of the bit-sync. If this parameter is estimated poorly, the modulation is not perfectly eliminated. This results in an unrolled phase affected by a modulation residue. The estimation of $\Delta\omega_0$ and $\theta_0$ is degraded as a result of this.

In order to have a good enough frequency estimation (error less than 10 Hz) which does not cause a decision error, it is necessary to use a preamble sequence longer than or equal to 64 bits.

With a 128-bit-packet this causes a maximum transmission efficiency of 50%.

Such an efficiency is certainly incompatable with packet transmission.

If from the outset a preamble sequence of smaller length with N=16 or 32 bits, is chosen the method explained above permits to obtain compensated samples.

However, the precision of the estimation is not sufficient for perfectly correcting the phase when there is a high noise level.

An error of 20 Hz between the beginning and the end of the message results in a phase rotation of 58°, which causes decision errors to occur at the end of the packet.

So it is thus the bits nearest to the end of the packet that are affected most.

The idea of the invention consists of deciding on a certain number of bits, for example, the 16 bits following the preamble sequence and making a re-estimation, while considering a new reference sequence which corresponds with the N bits of the preamble sequence plus 16 new bits which have been decided on.

In four new runs a precision of several Hertz will be attained for $E_b/N_0 = 6$ dB. In the end this will lead to an estimation over N+64 bits.

It has thus been possible to reduce considerably the length of the preamble sequence with the aid of the method of making an estimation in various successive runs or tours, which method exploits the intermediate decisions on the bit blocks and which is very noise resistant and has a fast convergence.

However, as has already been stated hereinbefore, the estimation of $\Delta\omega_0$ and $\theta_0$ is sensitive to the bit-sync.

A poor estimation of the bit-sync may result in a considerable difference $\epsilon$ between the points corresponding with the unwound phase and the regression line, where $$\epsilon = \sum_i (y_i - \Delta\omega_0 \cdot x_i - \theta_0)^2$$

In this case $\epsilon$ will augment more and more.

Very fast (at the first or the second run) $\epsilon$ will exceed a threshold value and command a change of the bit-sync.

For the value of the bit-sync will then be taken the secondary value SYNS.

The whole calculation process is then started anew to carry out the matched filtering and make the estimation of $\Delta\omega_0$ and $\theta_0$ with a new bit sync-value.

Decision

After compensation, the decision is made on the basis of the expression of the signal put in the form of an amplitude modulation which allows the principal function $F_p(t)$ to intervene.

For calcualting the transmitted bits it is sufficient to make a differential decoding in the end.

Figure 6:
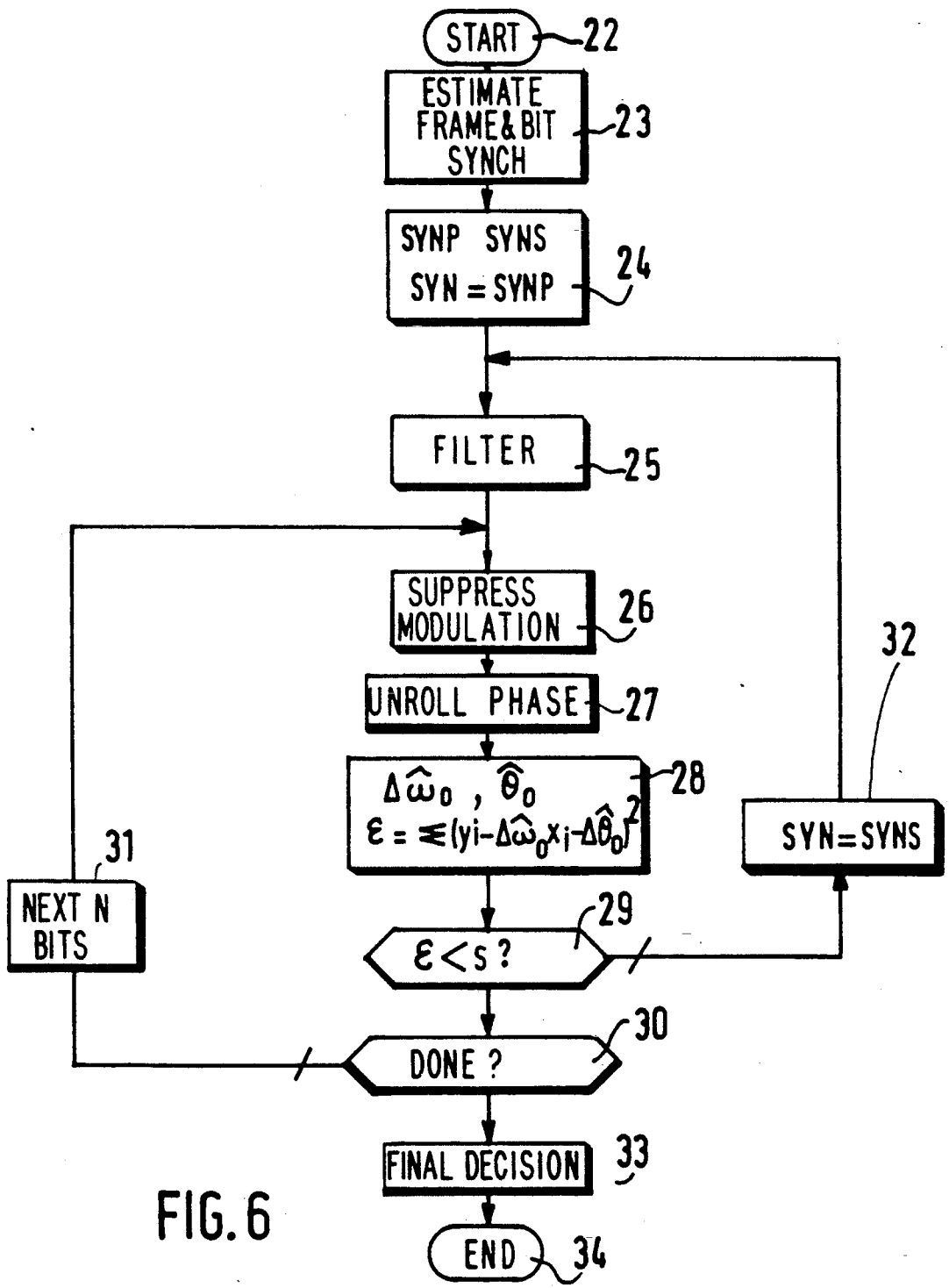
FIG. 6 shows the flowchart of the ensemble of demodulation processing according to the method of the invention.

FIG. 6 provides, by way of a flowchart, the complete calculation process.

Making an estimation of the parameters $\Delta\omega_0$ and $\theta_0$ from the START of the program (box 22) may seem hard to do, but it is systematic and relatively simple.

First a coarse estimation is made of the frame-sync (box 23) and the bit-sync (box 24) by means of correlation, a calculation of the SYNP and SYNS values for the bit-sync, and the initial choice SYN=SYNP for the value of the bit-sync SYN, then the matched filtering (box 25), then the approximate determination of the phase of the carrier signal by means of linear regression over 16 or 32 bit periods: suppression of the modulation (box 26), phase unrolling (box 27), estimation of $\Delta\omega_0$ and $\theta_0$ and the calculation of the difference $\epsilon$ (box 28). Finally, the calculated difference $\epsilon$ is compared to a threshold value S (box 29) and it is decided whether the last run or tour is concerned (box 30).

The result of the demodulation process may thus be described as a system of two interleaved digital loops:
a first loop for the estimation of $\Delta\omega_0$ and $\theta_0$ which closes again via the link 31,
a second loop for estimating the bit sync which closes again via the link 32.

With each tour through the first digital loop a decision is again made in the box 31 on the N bits which follow the preamble sequence in order to progressively improve the estimation of $\Delta\omega_0$ and $\theta_0$. These decisions are called intermediate.

With each passing through the second digital loop the difference $\epsilon$ is calculated in box 29 and compared with the threshold value. This criterion will permit to confirm or readjust the bit-sync. In the latter case the second value SYNS will be taken for the value of the bit-sync SYN (box 32).

Two possible cases are distinguished in the processing:
no reset on account of the bit-sync. $\Delta\omega_0$ and $\theta_0$ are thus determined in some few tours by a fast convergence of the first loop.
a reset on account of the bit-sync. In this case the whole filtering and demodulating process is started anew. The processing time via the path of the second loop thus becomes longer.

The rest of the flowchart on the basis of the last run or tour (box 30) comprises the implementation of the final decision (box 33) and of the END of the program (box 34).

Figure 7:
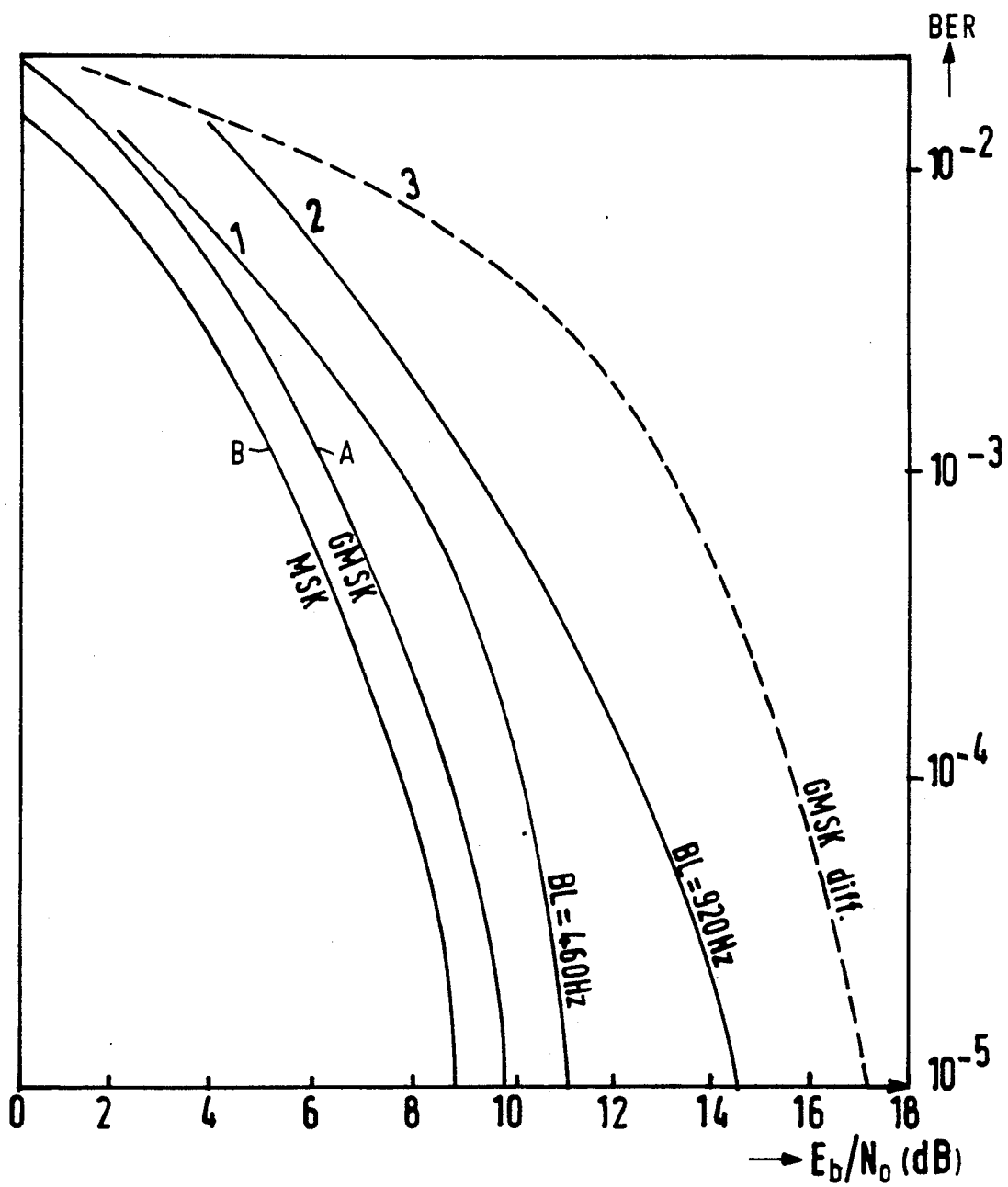
FIG. 7 shows the curves of the error rates set forth in the literature for the GMSK modulation.

By way of indication, FIG. 7 represents the curves A and B of theoretical bit error rates (BER) referenced in the literature for GMSK and MSK modulation.

For GMSK modulation the curves 1 and 2 correspond with a coherent demodulator with carrier recuperation by means of an analog phase lock loop having the passbands $B_L = 460$ Hz and 920 Hz, respectively.

This type of demodulation could thus function neither in the FH nor in the TDMA mode. Moreover, these curves are obtained without a frequency offset.

Curve 3 corresponds with the result obtained with an analog differential demodulator.

When the error rate is $10^{-2}$, the degradation relative to the theoretical error rate is considerable (approximately 7 dB).

Figure 8:
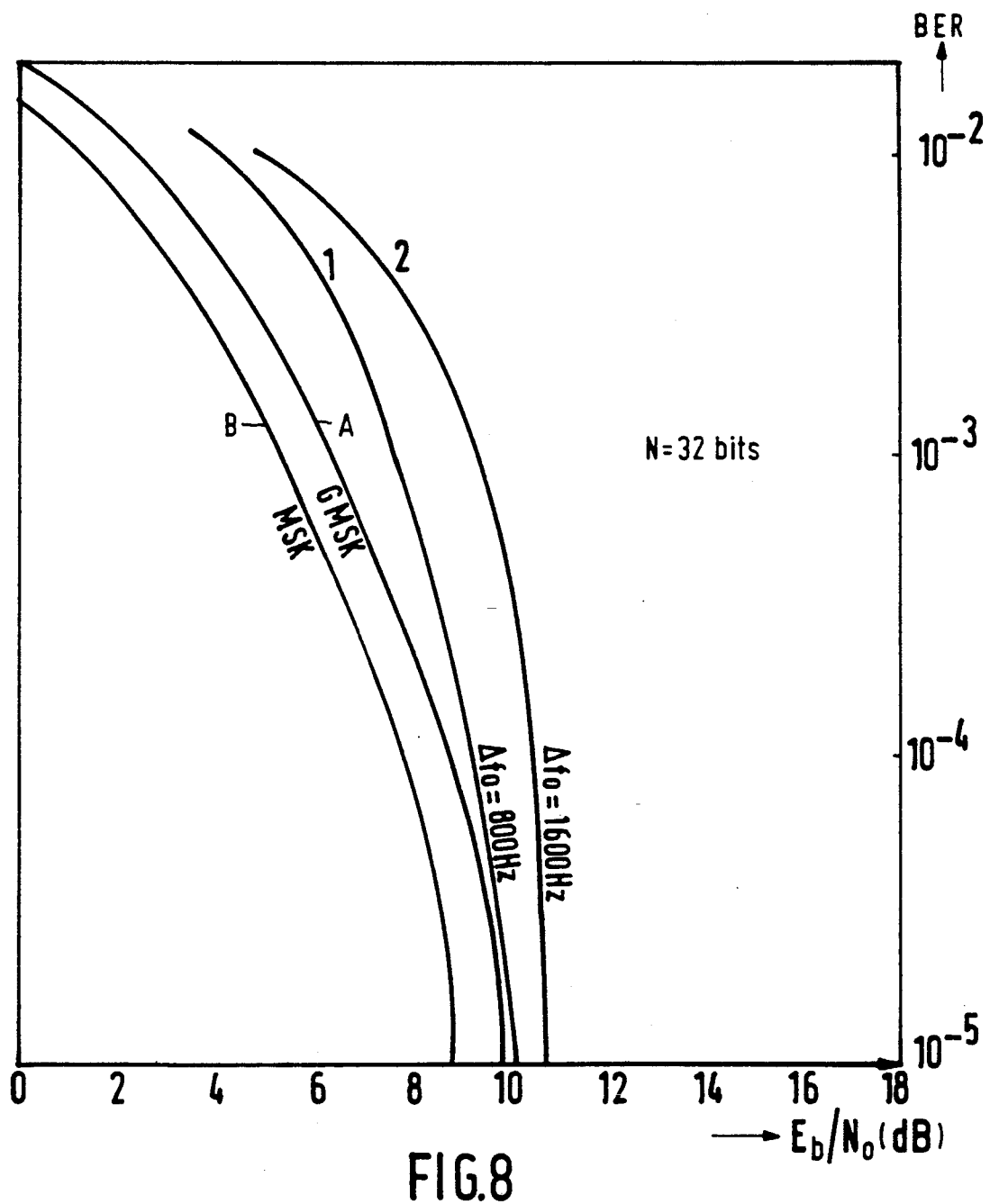
FIGS. 8 and 9 show the curves of the error rates for the demodulation process in accordance with the invention applied to a GMSK modulated signal.
Figure 9:
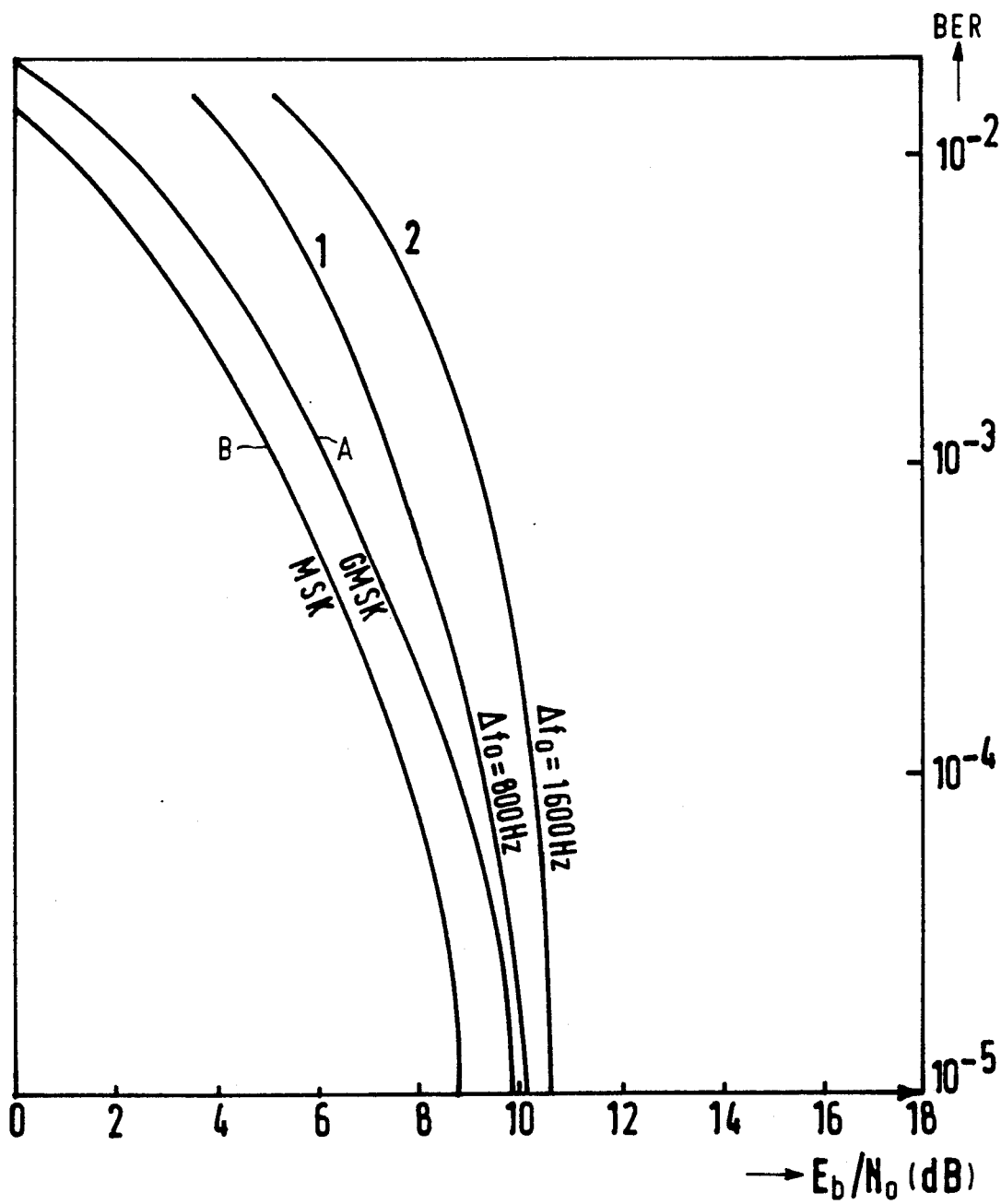

For the GMSK modulation the error rate curves obtained with the demodulation method according to the invention are represented in the FIGS. 8, 9 for the preamble sequences of 32 and 16 bits respectively, and with the frequency offsets $\Delta f_0 = 800$ Hz (curves 1) and $\Delta f_0 = 1600$ Hz (curves 2).

For $\Delta f_0 = 800$ Hz the results are rather good.

At an error rate of $10^{-2}$ there is a degradation of 1.2 dB for $N = 32$ bits and 1.4 dB for $N = 16$ bits relative to the theoretical error rate of which the curves A and B (already represented in FIG. 7) are also shown in the said Figures.

The results are slightly sensitive to the frequency offset as long as $\Delta f_0 < 1000$ Hz. Beyond that value, the results are slightly degraded.

The method according to the invention has enabled to use an algorithm for coherent demodulation of the digital GMSK modulation.

The results of the simulation show that this method shows good resistance to noise and to an even considerable frequency offset between the transmitter and the receiver.

This method is thus certainly compatible with operation in the TDMA or FH mode and it may be applied to whatever modulation presenting intersymbol interference.

We claim:

1. Method of coherent demodulation of a digitally modulated received signal having a continuous phase and a constant envelope, a modulated term of the continuous phase being equal to the convolution product of a phase impulse response extending over a plurality of bit periods, and binary information transmitted in packets, each packet having a known preamble of N bits, the received signal being transposed in a baseband over two quadrature channels, converted into a digital signal, and transferred to a digital signal processor which carries out the demodulation method, comprising the steps of:

detecting approximately, the frame-synchronization and the bit-synchronization of a packet by correlating said known preamble of N bits with a differential phase of the received signal;

beginning an estimation of approximate values $\hat{\theta}_0$ and $\Delta\hat{f}_0$ of an initial phase $\theta_0$ and residual frequency offset $\Delta f_0$, respectively, of the received signal;

progressively refining the approximate values of the initial phase and residual frequency offset by means of two interleaved digital loops: a slow loop for detecting the bit-synchronization, said slow loop being activated when a predetermined threshold value is exceeded by a difference $\epsilon$ which is a function of the approximate values $\hat{\theta}_0$ and $\Delta \hat{f}_0$, and a fast loop for effecting intermediate decisions over additional blocks of bits for extracting decided bits and for estimation of $\hat{\theta}_0$ and $\Delta \hat{f}_0$, said fast loop being activated following a determination that said predetermined threshold is not exceeded by said difference $\epsilon$.

2. A method as claimed in claim 1, in which the detecting step comprises a first correlation of said known preamble of N bits with the differential phase of the received signal for determining the bit synchronization of said packets at a precision of $\pm T/4$, where T is the duration of one bit, and a second correlation of said known preamble of N bits with the differential phase of the received signal effected with a reference signal shifted by $T/4$, the corresponding correlation functions each exhibiting a highest peak and a lowest peak which are independent of the initial phase and slightly dependent on the residual frequency offset, the highest peak and lowest peak defining a primary bit-synchronization value SYNP and a secondary bit-synchronization value SYNS respectively, the combination of said first and second correlations yielding a precision of $\pm T/8$ in the bit-synchronization detected, the detection of the bit-synchronization being followed by filtering the value SYNP by means of a matched filter having a finite impulse response of the Gaussian type in order to limit the noise band.

3. A method as claimed in claim 2 in which the estimation of the approximate values of the initial phase $\theta_0$ and of the residual frequency offset $\Delta f_0$ following the filtering step comprises the following steps:

eliminating a modulation term by forming the product of the received signal and the conjugate value of a reference signal;

phase unrolling by eliminating any $2\pi$ phase jumps to obtain a linear variation having the following equation $$Y = \Delta\omega_O x + \theta_O \text{ with } \Delta\omega_O = 2\pi\Delta f_O$$

calculating the approximate values $\Delta\omega_O$ and $\theta_O$ by means of linear regression method and the difference $$\epsilon = \sum_{i=0}^{N} |y_i - (\Delta\omega_0 \cdot x_i + \theta_0)|^2$$

between the points corresponding with the unrolled phase and a linear regression line.

4. A method as claimed in claim 3 in which when said difference $\epsilon$ is smaller than said threshold value, the estimation of the approximate values of $\Delta f_O$ and $\theta_O$ is refined following a repetition of said fast loop for a plurality of tours and exploiting an intermediate decision on the N bits of the preamble sequence to which, during each tour a specified number of additional decided bits are added.

5. A method as claimed in claim 3, in which when the said difference $\epsilon$ exceeds the said threshold value as a result of an erroneous evaluation of the bit-synchronization, said progressively refining step comprises initializing $\Delta f_O$ and $\theta_O$ following a slow loop to re-effect the matched filtering and the estimation of the approximate values of $\Delta f_O$ and $\theta_O$ by filtering said secondary bit-synchronization value SYNS.

6. A method as claimed in claim 3, in which the digitally modulated signals comprise signals modulated according to the GMSK, 2SRC, TFM, GTFM, . . . types of modulation, whose phase evolution law follows a progressive variation.

7. A method as claimed in claim 2 in which when said difference $\epsilon$ is smaller than said threshold value, the estimation of the approximate values of $\Delta f_O$ and $\theta_O$ is refined following a repetition of said fast loop for a plurality of tours and exploiting an intermediate decision on the N bits of the preamble sequence to which, during each tour a specified number of additional decided bits are added.

8. A method as claimed in claim 2, in which when the said difference $\epsilon$ exceeds the said threshold value as a result of an erroneous evaluation of the bit-synchronization, said progressively refining step comprises initializing $\Delta f_0$ and $\theta_0$ following a slow loop to re-effect the matched filtering and the estimation of the approximate values of $\Delta f_0$ and $\theta_0$ by filtering said secondary bit-synchronization value SYNS.

9. A method as claimed in claim 2, in which the digitally modulated signals comprise signals modulated according to the GMSK, 2SRC, TFM, GTFM, . . . types of modulation, whose phase evolution law follows a progressive variation.

10. A method as claimed in claim 1 in which when said difference $\epsilon$ is smaller than said threshold value, the estimation of the approximate values of $\Delta f_0$ and $\theta_0$ is refined following a repetition of said fast loop for a plurality of tours and exploiting an intermediate decision on the N bits of the preamble sequence to which, during each tour a specified number of additional decided bits are added.

11. A method as claimed in claim 10, comprising at the end of the last tour of said fast loop the additional steps of:

compensating the received signal by eliminating the effect of the residual frequency offset and the initial phase, and then making a final decision step and differential decoding the compensated signal to produce a stream of transmitted binary information.

12. A method as claimed in claim 11, in which the digitally modulated signals comprise signals modulated according to the GMSK, 2SRC, TFM, GTFM, . . . types of modulation, whose phase evolution law follows a progressive variation.

13. A method as claimed in claim 10, in which the digitally modulated signals comprise signals modulated according to the GMSK, 2SRC, TFM, GTFM, . . . types of modulation, whose phase evolution law follows a progressive variation.

14. A method as claimed in claim 1, in which when the said difference $\epsilon$ exceeds the said threshold value as a result of an erroneous evaluation of the bit-synchronization, said progressively refining step comprises initializing $\Delta f_O$ and $\theta_O$ following a slow loop to re-effect the matched filtering and the estimation of the approximate values of $\Delta f_O$ and $\theta_O$ by filtering said secondary bit-synchronization value SYNS.

15. A method as claimed in claim 14, in which the digitally modulated signals comprise signals modulated according to the GMSK, 2SRC, TFM, GTFM, . . . types of modulation, whose phase evolution law follows a progressive variation.

16. A method as claimed in claim 1, in which the digitally modulated signals comprise signal modulated according to the GMSK, 2SRC, TFM, GTFM, . . . types of modulation, whose phase evolution law follows a progressive variation.

* * * * *